United States Patent
Assel et al.

[11] Patent Number: 5,490,888
[45] Date of Patent: Feb. 13, 1996

[54] MIXTURE OF REACTANTS FOR USE IN WELDING

[75] Inventors: Mark Assel, Cleveland Heights; James E. Whetsel, Twinsburg, both of Ohio

[73] Assignee: Erico International Corporation, Solon, Ohio

[21] Appl. No.: 163,156

[22] Filed: Dec. 6, 1993

[51] Int. Cl.[6] ............................................. C06B 33/00
[52] U.S. Cl. .................................... 149/37; 149/108.2
[58] Field of Search ............................. 149/37, 108.2

[56] References Cited

U.S. PATENT DOCUMENTS

| | | | |
|---|---|---|---|
| 1,872,254 | 8/1932 | De Golyes . | |
| 2,282,175 | 5/1942 | Emerson | 149/37 |
| 2,424,937 | 7/1947 | Linzell | 44/3 |
| 2,569,956 | 10/1951 | Schiltknecht | 126/263 |
| 2,831,760 | 4/1958 | Rejdak | 75/959 |
| 2,870,498 | 1/1959 | Rejdak | 75/959 |
| 2,870,499 | 1/1959 | Burke | 22/205 |
| 3,020,610 | 2/1962 | Rejdak | 22/203 |
| 3,033,672 | 5/1962 | Rejdak | 149/37 |
| 3,086,876 | 4/1963 | Griggs et al. | 149/37 |
| 3,116,142 | 12/1963 | Rylander | 75/27 |
| 3,160,537 | 12/1964 | Trafton | 149/37 |
| 3,192,080 | 6/1965 | Cooper | 149/37 |
| 3,415,697 | 12/1968 | Bredzs et al. | 149/109 |
| 3,899,306 | 8/1975 | Knopp et al. | 29/197 |
| 4,104,093 | 8/1978 | Yamaji | 149/37 |
| 4,235,649 | 11/1980 | Inamura et al. | 148/24 |
| 4,349,396 | 9/1982 | Muellar et al. | 149/19.3 |
| 4,881,681 | 11/1989 | Pond, Sr. | 228/198 |
| 5,062,903 | 11/1991 | Bronan et al. | 148/24 |
| 5,171,378 | 12/1992 | Kovarik et al. | 148/24 |

FOREIGN PATENT DOCUMENTS 0919815  2/1963  United Kingdom .

*Primary Examiner*—Edward A. Miller
*Attorney, Agent, or Firm*—Renner, Otto, Boisselle & Sklar

[57] ABSTRACT

The invention provides a new and improved process and exothermic reaction mixture for use in the process for producing molten weld metal. The molten weld metal is used in joining one non-ferrous metal piece with at least one other metal piece. The process and exothermic reaction mixture have distinct advantages over the prior art. These advantages include a higher filler metal yield, reduction of odor, and a higher quality corrosion resistant weld. These advantages are accomplished by a process wherein a reactant mixture is provided which has a reducing agent, a filler metal which does not react with any of the compounds of the mixture, and two or more metallic compounds which are exothermically reduced by the reducing agent. The metallic compounds subsequently form a compound, with the reducing agent, having a high heat of formation which provides an exothermic reaction with sufficient heat to melt the filler metal. The reactant mixture is exothermically reacted to release heat and melt the filler metal and provide a flow of filler metal from the reactant and product mixture which may be contacted with objects to be welded by the filler metal.

15 Claims, 1 Drawing Sheet

MIXTURE OF REACTANTS FOR USE IN WELDING

This invention relates generally to the art of welding. More particularly, the invention concerns a unique exothermic welding process, a novel mixture of reactants for use in such process and weldments resulting from such process.

BACKGROUND OF THE INVENTION

The thermite reaction has been utilized for a long period of time in order to provide weldments normally associated with the railroad industry. The thermite reaction is comprised of a reaction between aluminum and a metal oxide wherein the metal oxide is reduced providing a filler metal, i.e., the source of the filler metal is the oxide on reduction. The "Goldschmidt" reaction is the basis of the application of the process described in U.S. Pat. No. 2,229,045 to Charles A. Cadwell. This reaction is as follows:

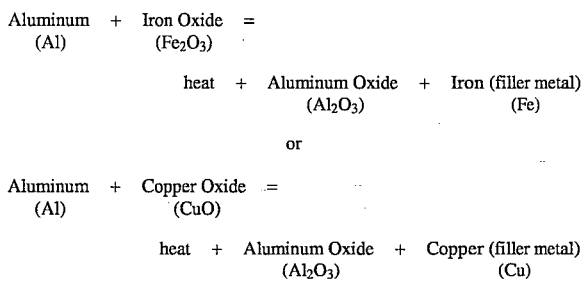

The "Goldschmidt" reaction has been successfully utilized over the years to weld or join metals such as iron (Fe) and copper (Cu). However, the process is not particularly well adapted for use in joining metals such as aluminum (Al) wherein the use of a copper (Cu) or iron (Fe) filler metal is generally unacceptable.

U.S. Pat. No. 3,020,610 to Rejdak discloses a method of welding aluminum (Al) and other metals, and provides a listing of various reactions which can be utilized to provide a weldment. Unfortunately, in the method disclosed by Rejdak the weld which is formed is not suitable for some applications. For example, a weldment produced by the Rejdak method in some environments (such as continuous immersion in rainwater, for example) may be susceptible to a high level of corrosion due to the presence of impurities or unwanted elements in the resultant weldment.

U.S. Pat No. 2,569,956 to Schiltknecht discloses a process wherein a thermite reaction is utilized to join together a pair of nonferrous metal pieces by melting a sleeve about the metal pieces. This process is usually referred to as the "Alusuisse Process" referring to a welding system produced by Swiss Aluminum Ltd. of Zurich.

U.S. Pat No. 5,062,903 to Brosnan discloses a process whereby a reducing agent is used to produce heat to melt a filler metal, which then flows out to provide a weldment. Other product components are left behind in a slag with reaction gases released. The process is generally summarized as follows:

Reducing agent+filler metal+metallic compound= heat+weld metal+slag+gases

The Brosnan invention was used to weld aluminum metal by using aluminum powder as both the reducing agent and filler metal, and calcium sulfate ($CaSO_4$) as the metallic compound. The basic reaction is:

$Al+CaSO_4$=heat+$Al_2O_3$+$CaS$+$Al$

The weld metal produced by this reaction was essentially pure (99%) aluminum (Al). However, the weldments had much lower strengths than that of the aluminum pieces to be welded. The solidified weld metal also had high levels of porosity in some instances.

U.S. Pat. No. 5,171,378 to Kovarik discloses an invention which improves on the Brosnan process through the addition of silicon, (Si), which strengthens the weld metal considerably. The porosity is also reduced through the addition of sodium chloride (NACl).

One major drawback of both the Brosnan and Kovarik processes for welding aluminum is that the weld and slag processes give off a strong unpleasant odor of hydrogen sulfide ($H_2S$) after the weld has been made. This severely limits commercial acceptance of such an invention.

SUMMARY OF THE INVENTION

The present invention provides a new and improved process and exothermic reaction mixture for use in the process for producing molten weld metal. The molten weld metal is used in joining one non-ferrous metal piece with at least one other metal piece. The process and exothermic reaction mixture have distinct advantages over the prior art. These advantages include a higher filler metal yield, reduction of odor, and a higher quality corrosion resistant weld. These advantages are accomplished by a process wherein a reactant mixture is provided which has a reducing agent, a filler metal which does not react with any of the compounds of the mixture, and two or more metallic compounds which are exothermically reduced by the reducing agent. The metallic compounds subsequently form a compound, with the reducing agent, having a high heat of formation which provides an exothermic reaction with sufficient heat to melt the filler metal. The reactant mixture is exothermically reacted to release heat and melt the filler metal and provide a flow of filler metal from the reactant and product mixture which may be contacted with objects to be welded by the filler metal.

The process is particularly well suited for use in joining one piece of nonferrous metal such as aluminum (Al) or aluminum alloys with at least one other metal. The other metal can be aluminum (Al), aluminum alloys, copper (Cu), or one of the various steels known in the art. When aluminum (Al) or an aluminum alloy piece is being joined to another metal the reaction mixture may comprise less than or equal to about 50 percent by weight of a Group I metal sulfate, less than or equal to about 50 percent by weight of a Group II metal sulfate, from about 20 percent to about 75 percent by weight aluminum, (Al) from about 0.1 percent by weight to about 45 percent by weight silicon (Si), less than or equal to about 20 percent by weight of a Group I metal fluoride flux, and less than or equal to about 20 percent by weight of a Group I metal fluoroborate flux.

Further, the present invention includes a weldment joining at least one aluminum or aluminum alloy piece to at least one other metal piece comprising greater than or equal to about 85 percent by weight aluminum, less than or equal to about 1 percent by weight Group I metal, less than or equal to about 1 percent by weight Group II metal, less than or equal to about 1 percent by weight sulfur, and less than or equal to 15 percent by weight silicon.

The present invention also contemplates a method of further reducing the odor of the weld metal and slag produced by the reactions described in the Kovarik and Brosnan patents. In this process the weldment and slag are sprayed after cooling with a substance containing terpenes. The odor of hydrogen sulfide (H$_2$S) is significantly reduced.

DETAILED DESCRIPTION OF THE PREFERRED EMBODIMENTS

Figure 1:
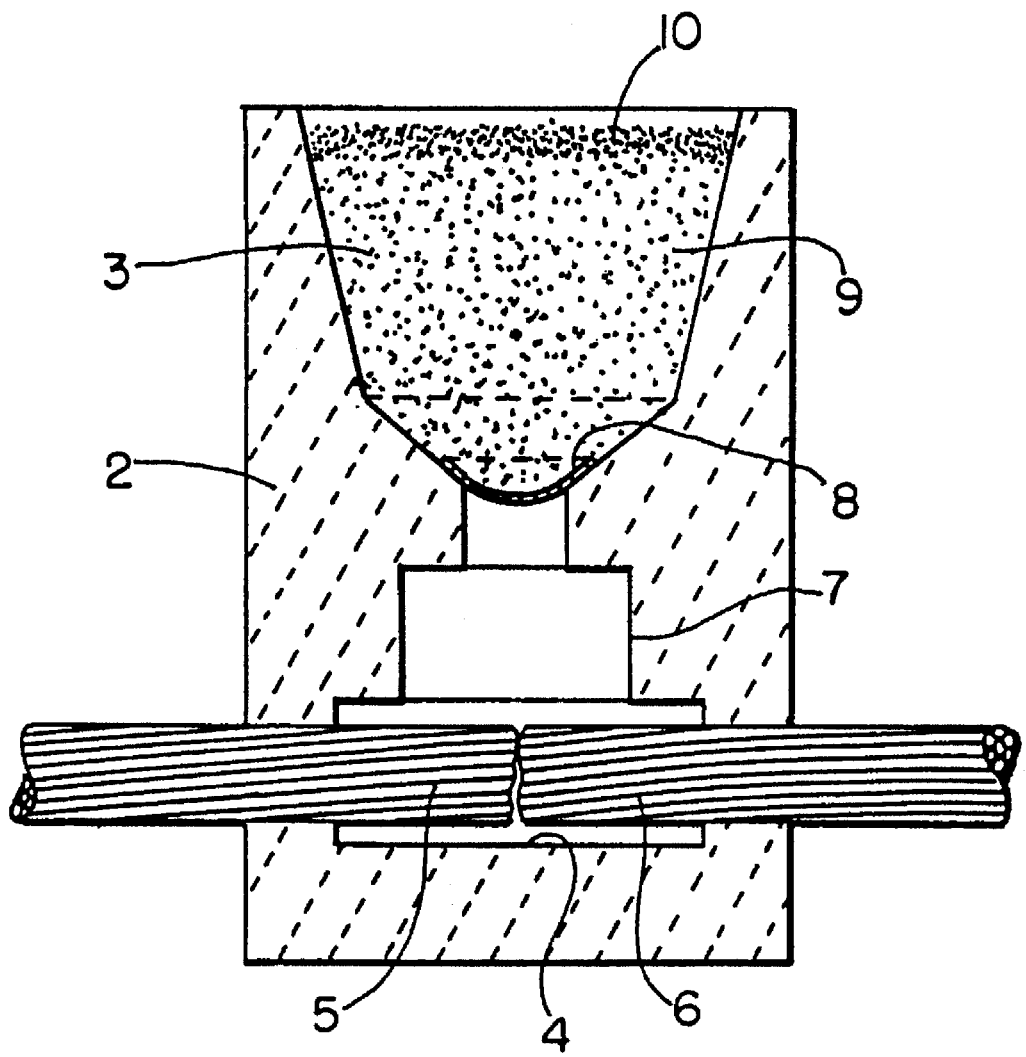
FIG. 1 is a cross-sectional view of a welding apparatus suitable for use in the present invention.

A mixture of reactants is provided with two or more metallic compounds which are exothermically reduced by a reducing agent to produce heat to melt a filler metal which then flows from the reactant and product mixture to provide a weldment. Other product components are left behind in a slag with reaction gases released. The process is generally summarized as follows:

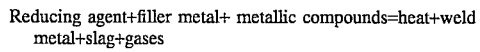

In accordance with this invention it has been found with the above reaction that the reducing agent may be selected from the group consisting of aluminum (Al), magnesium (Mg), zirconium (Zr), titanium (Ti) and equivalent metals which exhibit compounds which have a high thermodynamic heat of formation with respect to the reaction product between the metal and the metallic compound to be reduced. For example, aluminum (Al) can reduce a metal oxide or sulfate forming aluminum oxide (Al$_2$O$_3$) which exhibits a heat of formation of 399 kcal/mole at 25° celsius. Such a reaction is highly exothermic providing sufficient heat to raise the temperature of the filler metal beyond its melting point so that the molten filler metal can be directed into a weld cavity, i.e., the mold, to affect the weld and join two or more metallic pieces or sections.

The metallic compounds are those that are generally subject to reduction by the reducing agent and upon reduction contribute one or more elements to exothermically form a compound with the reducing agent. The metallic compounds of the present invention are generally metal compounds containing oxygen such as metal oxides or metal sulfates. The reaction between aluminum and metal compounds containing oxygen is particularly useful because of the high amount of heat liberated when aluminum oxide (Al$_2$O$_3$) is formed. However, other exothermic reactions may be employed, such as the one between magnesium (Mg) and polytetrafluoroethylene (C$_2$F$_4$)n, forming magnesium fluoride (MgF$_2$) and providing heat to melt the filler metal. Magnesium fluoride exhibits a heat of formation of 264 kcal/mole at 25° Celsius. The metallic compounds used in this invention generally do not, on reduction via reaction with the reducing agent, provide for a metallic phase which serves as the filler metal or becomes a part of the resultant weld metal. In fact, the metallic compounds of the present invention upon reduction via reaction with the reducing agent usually form minerals associated with the slag or oxide residual. This is in contrast to the method disclosed in Cadwell U.S. Pat. No. 2,229,045 wherein the metallic compound (i.e., iron oxide (Fe$_2$O$_3$) provides a metallic phase on reduction to become the filler metal or resultant weld metal (i.e., iron (Fe)).

As previously indicated the prior art exothermic reaction processes suffered the drawback of having an offensive odor due to the hydrogen sulfide generated by the resultant weld metal and slag. It has been found that the inclusion of a second metal compound and one or more fluxing compounds reduces this odor.

Accordingly, the metallic compounds of the present invention contain at least two or more metallic compounds. At least one of the metallic compounds can be a Group I metal compound. Group I metals, also know as alkali metals, being those metals contained in Group I of the periodic table of elements. Preferably, the metallic compounds contain at least one Group I metal sulfate such as Li$_2$SO$_4$, Na$_2$SI$_4$, and K$_2$SO$_4$. At least one of the metallic compounds can be a Group II metal compound. Group II metals, also know as alkaline earth metals, are those contained in Group II of the periodic table of elements. Preferably, the metallic compounds contain at least one Group II metal sulfate such as MgSO$_4$, CaSO$_4$, and BaSO$_4$.

The filler metal of the present invention may be any metal which is desired to be utilized in a welding process. Because of their use in electric transmission applications, aluminum (Al) and copper (Cu) are particularly useful as filler metals to weld aluminum or copper articles, respectively. In the case of aluminum welds wherein one or more sections of aluminum are being joined, the filler metal and the reducing agent are both aluminum. In the case of copper welds where one or more sections of copper are being joined, mixtures or alloys of copper and aluminum can be used to provide for the reduction process and to provide for the filler metal. Additional filler metals may be selected from the group consisting of iron (Fe), iron alloys, nonferrous metals and alloys, solders and brazing filler metals or others where the heat from the exothermic reaction is sufficient to raise the temperature of the filler metal beyond its melting point and to provide additional superheat to the filler metal such that it is useful in producing molten metal for joining metallic pieces.

The mixture of reactants may additionally include one or more fluxes to lower the melting point of the mixture and products. Commonly utilized fluxes can be used to lower the fusion point and increase the fluidity of the reaction products (i.e. "slag") such that the molten filler metal can readily be separated from the slag and flow into the mold cavity. Proper selection of a flux or a combination of fluxes can increase the weld metal yield through greater weld metal-slag separation and reduce hydrogen sulfide odor. Accordingly, it has been determined that fluxes which are Group I metal compounds are suitable for this purpose. At least one of the fluxes of the present invention can be a Group I metal compound such as Group I metal fluorides and fluoroborates. Preferably, the fluxes are selected from the group NaF, KF and KBF$_4$. When two or more Group I metal fluoride or fluoroborate fluxes are utilized, an exothermic reaction mixture having only one metallic compound is suitable to reduce hydrogen sulfide odor.

Another improvement of this invention over those of Kovarik and Brosnan is the increase in weld metal yield. Through the proper selection of metallic compounds (i.e. sulfates) and flux compounds (fluorides) the weld metal yield can be increased by up to 40%. This means that less weld material mixture can be used to make the same weld, and a smaller crucible can also be employed. These improvements can result in significant cost savings.

The process of this invention also helps to eliminate segregation in the weld metal caused by limited solubility of constituents such as aluminum (Al) and tin (Sn) as found in the prior art thermite process for welding aluminum conductors. The segregation is reduced because the reactants producing the heat remain in the slag, allowing only the molten aluminum alloy to enter the weld cavity. The process also helps to eliminate the presence of elements causing galvanic corrosion thus providing improved connections for power transmission and grounding, both indoors and outdoors. The process also eliminates additional steps or equipment as required with the "Alusuisse Process" or furnaces used in foundry welding operations.

The present invention further includes a weldment which joins one non-ferrous metal piece with at least one other metal piece. The weldment is prepared by the subject process using the exothermic reaction mixture. The weldment comprises greater than or equal to 85 percent by weight filler metal, with the remainder being Group I and/or Group II metal, sulfur and silicon.

When the weldment joins one aluminum (Al) piece and at least one other metal piece the weldment comprises greater than or equal to about 85 percent by weight aluminum (Al), less than or equal to 1 percent by weight Group I metal and/or less than or equal to 1 percent by weight Group II metal, less than or equal to 1 percent by weight sulfur, and less than or equal to 15 percent by weight silicon.

The process of this invention is particularly well adapted for use with the welding apparatus formed from two graphite blocks or various other refractory materials as shown in U.S. Pat No. 3,020,610. FIG. 1 is an example of a welding apparatus 1 which may be utilized with the present invention. Welding apparatus 1 comprises a pair of blocks 2 which are hollowed out to provide an upper crucible portion 3 and a mold cavity portion 4. Blocks 2 are releasably connected or clamped using any one of a variety of means. Metallic pieces or more particularly, cable ends 5 and 6 are clamped in the mold cavity portion 4 with their opposed yet slightly separated ends located substantially vertically below sprue 7, which is closed by means of a small metal disk 8. The mixture of reactants 9 is then placed in the crucible portion 3 and a starting material 10 may then be placed on top of the mixture of reactants 9. The starting material 10 may then be ignited with a flint ignitor, which in turn ignites the exothermically reacting mixture of reactants 9 to produce molten metal which melts through disk 8 and drops into mold cavity portion 4 thereby contacting and joining the ends of the cables 5 and 6. It will be appreciated that in addition to a flint ignitor alternative ignition means may be employed such as an electrical ignition system as disclosed in Amos et al U.S. Pat No. 4,885,452.

An additional part of this invention involves application of a chemical to the exposed surfaces of the weldment and slag after they have cooled to ambient temperature. The unpleasant hydrogen sulfide ($H_2S$) odor that is given off by the reaction products can be significantly reduced. The active chemical is a member of the terpene family. Preferred terpenes are the orange terpenes such as d-Limonene. Orange terpenes are a bi-product of the citrus industry and are derived from the peels of oranges, grapefruits and other citrus fruits. The orange terpene may be used by dissolving it in an appropriate solvent, such as water or ethanol ($C_2H_4OH$), and spraying the liquid onto the surfaces of the weld and slag. The hydrogen sulfide is believed to be generated by reaction of the metallic sulfides (such as CaS and $Al_2S_3$) that are present in the slag and on the surface of the weld metal with either liquid water or moisture present in the air. The orange terpenes apparently reduce the amount of hydrogen sulfide either by preventing its formation or by combining with it.

EXAMPLE 1

I.

A thermite reaction per the teachings of this disclosure was conducted as follows in a graphite crucible and mold which holds 2/0 copper cables (concentric lay, 7 strands, 0.419 diameter) to be joined and provides for a casting mold at the cable junction using the following thermite mixture:

| Constituent | Weight Percent |
| --- | --- |
| $CaSO_4$ | 22.0 |
| $Li_2SO_4$ | 10.0 |
| Al | 62.0 |
| $CaF_2$ | 6.0 |

Particle Size Distributions of Materials
Calcium Sulfate ($CaSO_4$) Type B

| | |
| --- | --- |
| $-44$ μm | 99% |
| $-20$ μm | 98% |
| $-10$ μm | 95% |
| $-5$ μm | 79% |
| $-2$ μm | 60% |
| $-1$ μm | 40% |
| average size (μm) | 1.4 |

Lithium Sulfate ($Li_2SO_3$)

| | |
| --- | --- |
| +20 mesh | 17.8% |
| −20 + 40 mesh | 52.7% |
| −40 + 70 mesh | 19.7% |
| −70 + 100 mesh | 4.6% |
| −100 mesh | 5.2% |

| Aluminum (Al) Powder | | Calcium Fluoride ($CaF_2$) | |
| --- | --- | --- | --- |
| −20 mesh | 100% | +50 mesh | 2% max. |
| −20 + 40 mesh | 5% max. | −50 + 100 mesh | 10% max. |
| −40 + 50 mesh | 1–10% | −100 + 140 mesh | 5–20% |
| −50 + 80 mesh | 15–30% | −140 + 200 mesh | 10–25% |
| −80 + 140 mesh | 35–50% | −200 + 325 mesh | 20–40% |
| −140 + 325 mesh | 25–45% | −325 mesh | balance |
| −325 mesh | 5% max. | | |

The three weldments made by this process had at most five small voids visible to the naked eye. The cable ends, including the central strands, were all fused to the filler metal. The yield of weld filler metal was 39% for both welds.

II

Five thermite reactions (made in the same graphite crucible and mold as used in section I) were made using the formula from Kovarik U.S. Pat. 5,171,378 Example 7 section I, which is as follows:

| Constituent | Weight Percent |
| --- | --- |
| $CaSO_4$ Type A | 17.3 |
| $CaSO_4$ Type B | 17.3 |
| Al | 51.7 |
| Si | 4.3 |
| $CaF_2$ | 5.2 |
| NaCl | 4.2 |

The particle sizes of the constituents are as follows

| Calcium Sulfate ($CaSO_4$) | Type A | Type B |
| --- | --- | --- |
| $-44$ μm | 100% | 99% |
| $-20$ μm | 100% | 98% |
| $-10$ μm | 95% | 95% |
| $-5$ μm | 63% | 79% |
| $-2$ μm | 23% | 60% |
| $-1$ μm | 9% | 40% |
| average size (μm) | 3.75–4.4 | 1.4 |

| Aluminum (Al) Powder | | Silicon (Si) - 1% Iron (Fe) | |
| --- | --- | --- | --- |
| −20 mesh | 100% | +30 mesh | 1% max. |
| −20 + 40 mesh | 5% max. | −30 + 40 mesh | 1% max. |
| −40 + 50 mesh | 1–10% | −40 + 50 mesh | 1–10% |
| −50 + 80 mesh | 15–30% | −50 + 100 mesh | 45–75% |

-continued

| | | | |
|---|---|---|---|
| −80 + 140 mesh | 35–50% | −100 + 200 mesh | 20–45% |
| −140 + 325 mesh | 25–45% | −200 mesh | 5% max. |
| −325 mesh | 5% max. | | |

| Calcium Fluoride (CaF$_2$) | | Sodium Chloride (NaCl) | |
|---|---|---|---|
| 50 mesh | 2% max. | +35 mesh | bal. |
| −50 + 100 mesh | 10% max. | −35 + 50 mesh | 67% |
| −100 + 140 mesh | 5–20% | −50 + 80 mesh | 16% |
| −140 + 200 mesh | 10–25% | −80 + 100 mesh | 1% |
| −200 + 325 mesh | 20–40% | −100 + 140 mesh | 2% |
| −325 mesh | balance | −140 mesh | trace |

The reactions were used to attempt to weld the ends of 2/0 aluminum cable, as done in section I. The first three reactions failed to produce enough weld metal to form satisfactory welds of the cable ends. The fourth and fifth reactions yielded enough filler metal (30% and 31%) to produce welds with adequate fusion of the cable ends.

EXAMPLE 2

Three thermite reaction per the teachings of this disclosure was conducted in a graphite crucible and mold which holds two cable ends to be joined and provides for a casting mold at the cable junction using the following thermite mixture:

| Constituent | Weight Percent |
|---|---|
| MgSO$_4$ | 36.0 |
| Al | 59.0 |
| KF | 5.0 |

The particle size of the aluminum (Al) powder used in the mixture is the same as that stated above in Example 1. The particle sizes of the other two ingredients are as follows:

| Magnesium Sulfate (MgSO$_4$) | | Potassium Fluoride (KF) | |
|---|---|---|---|
| <44 μm | 100% | +50 mesh | 23.7% |
| | | −50 + 100 mesh | 76.3% |
| | | −100 mesh | Trace |

The reactions were used to join the ends of 2/0 aluminum cable. The cable ends were all fused to the filler metal, and there was no porosity visible to the naked eye.

EXAMPLE 3

Thermite reactions per the teachings of this disclosure were conducted in a graphite crucible and mold using the following mixture to affect welds in 250 kcmil aluminum cable segments:

| Constituent | Weight Percent |
|---|---|
| CaSO$_4$ Type A | 15.0 |
| CaSO$_4$ Type B | 15.0 |
| Al | 54.0 |
| NaF | 4.0 |

The particle sizes of the reactants are the same as those of Example 1 Section II, except for sodium fluoride (NaF) which is below:

| Sodium Fluoride (NaF) | |
|---|---|
| + 100 mesh | 0.1% |
| −100 + 150 mesh | 3.2% |
| −150 + 200 mesh | 33.8% |
| −200 + 325 mesh | 44.1% |
| −325 mesh | 18.8% |

The process of the present invention may be successfully utilized with an alloying element such as silicon (Si) incorporated into the mixture of reactants. In many applications the incorporation of silicon into the mixture can be highly desirable. It has been found that the silicon provides a range of temperatures over which the weld metal will solidify, thus allowing the molten weld metal to feed the solidifying interface. This helps prevent hot cracking and allows gases to escape during solidification, thereby reducing porosity in the weldment. Silicon also has the effect of strengthening the weld metal. The silicon may be provided as elemental silicon or as aluminum-silicon alloy. The benefits of silicon addition are further described in Kovarik U.S. Pat. No. 5,171,378.

The particle size of the sulfate powders should preferably be less than 3 μm. Powders of a smaller size tend to agglomerate the mixture of reactants, providing for spheroids that improved the flowability of the mixture. The flowability of the powder mixture was determined to be very important to the consistency of the welding process. The reaction and welding consistency are discussed more fully in Kovarik U.S. Pat. No. 5,171,378.

EXAMPLE 4

Ten weldments of two ¼"×4" aluminum busbars in a straight splice were made with the following formula:

| Formula I | |
|---|---|
| Constituent | Weight Percent |
| CaSO$_4$ Type A | 12.0 |
| CaSO$_4$ Type B | 12.0 |
| Na$_2$SO$_4$ | 5.0 |
| Al | 55.8 |
| Si | 5.0 |
| NaF | 5.2 |
| LiF | 4.8 |
| SiO$_2$ | 0.2 |

The particle sizes of the constituents CaSO$_4$ (Types A & B), aluminum (Al), silicon (Si), and sodium fluoride (NaF) are as stated in Examples 1 and 3 above. The other constituents have particles sizes as follows:

| Sodium Sulfate (Na$_2$SO$_4$) | | Lithium Fluoride (LiF) | |
|---|---|---|---|
| 50 mesh | 3.1% | −325 mesh | 95% min. |
| −50 + 80 mesh | 39.7% | Amorphous Precipitated Silica (SiO$_2$) | |
| −80 + 100 mesh | 39.7% | Average agglomerate size 5–7 μm | |
| −100 + 150 mesh | T | | |
| −150 + 200 mesh | 1.2% | | |
| −200 + 325 mesh | 8.2% | | |
| −325 mesh | 8.1% | | |

Twenty weldments were made using the process described in Kovarik U.S. Pat. No. 5,171,378 welding two ¼"×4" aluminum busbars in a straight splice with the following formula:

Twenty weldments were made using the process described in Kovarik U.S. Pat. No. 5,171,378 welding two ¼"×4" aluminum busbars in a straight splice with the following formula:

Formula II

| Constituent | Weight Percent |
|---|---|
| CaSO$_4$ Type A | 17.3 |
| CaSO$_4$ Type B | 17.3 |
| Al | 51.7 |
| Si | 4.3 |
| CaF$_2$ | 5.2 |
| NaCl | 4.2 |

The particle sizes of the constituents are the same as stated in Example 3 above, except for that of sodium chloride (NaCl) which is as follows:

Sodium Chloride (NaCl)

| +35 mesh | bal. |
|---|---|
| −35 + 50 mesh | 67% |
| −50 + 80 mesh | 16% |
| −80 + 100 mesh | 1% |
| −100 + 140 mesh | 2% |
| −140 mesh | trace |

The average tensile load value of the ten splices made above pursuant to Formula I was 17,080 pounds, and the sample standard deviation was 1830 pounds. The average tensile load made pursuant to the Formula II was 15,040 pounds with a sample standard deviation of 880 pounds.

One major drawback of the Kovarik type formula (Formula II) is the odor of the weld metal and slag. A strong unpleasant odor of hydrogen sulfide (H$_2$S), or "rotten egg" smell, is given off after the weldment and slag have cooled down to ambient temperature. Metal sulfides present in the slag and on the surface of the weld metal react with moisture in the air to produce hydrogen sulfide. The odor can persist for weeks after the weldment is made, and this is a serious drawback that limits customer acceptance. The weldments and slag made with Formula I have a much reduced hydrogen sulfide odor. Such odor is much stronger for the Kovarik type formulation (Formula II) than it is for the formulation of Formula I.

Another advantage Formula I has over the Kovarik type Formula II is an increase in the yield of the filler metal. The two welds made with Formula II had an average filler metal yield of 31% of the weight of the initial powder mixture. The corresponding average yield for the welds of Formula I was 41%. The addition of the secondary metal sulfate and the fluoride flux facilitate separation of the molten aluminum and slag, thus permitting more aluminum to coalesce into the filler metal. The greater yield means less material needs to be used to make a given weld. This is an advantage from a cost savings standpoint.

EXAMPLE 5

Two straight splice weldments were made of 250 kcmil aluminum cable. One weld was made with Formula I from Example 4, and the other was made with Formula II. Ten minutes after each weld was made the slag plus the weldment was placed in a 2-quart container. Identical moistened pieces of absorbent paper were added to each container, and the containers were sealed from the outside air. One hour after sealing, the air inside each container was sampled through a small hole in the top of the container. The hydrogen sulfide (H$_2$S) content of the air from the Formula I weld was 18 parts per million (ppm), and was over 2000 ppm for the air from the Formula II weld. This represented a more than 100-fold decrease in hydrogen sulfide content from the Kovarik-type Formula II.

EXAMPLE 6

Two weldments were made using the Formula I from Example 4. Commercial 2/0 aluminum cable was welded in a straight splice in a graphite mold as stated in Example 1. The joined cables were tested for resistance and ultimate tensile strength. The results are as follows:

| | Resistance (μΩ, 12" gage) | Tensile Strength (lb/in$^2$) |
|---|---|---|
| Unsectioned Annealed Cable | 134 | 11,145 |
| Welded Cable #1 | 129 | 12,284 |
| Welded Cable #2 | 131 | 12,519 |

The sectioned welds revealed that the cable ends were fused to the filler metal. There were three or fewer voids visible in the cross-sections of the welds.

A weld metal nugget obtained from the reaction of this formula was subjected to chemical analysis, and the following metal composition was found (weight percent):

| Silicon (Si) | 9.67% |
|---|---|
| Sulfur (S) | 0.035% |
| Calcium (Ca) | 0.038% |
| Sodium (Na) | 0.036% |
| Lithium (Li) | 0.049% |
| Aluminum (Al) | Remainder |

EXAMPLE 7

I

Two welds were made using the following formula:

| Constituent | Weight Percent |
|---|---|
| CaSO$_4$ Type A | 12.7 |
| CaSO$_4$ Type B | 12.7 |
| Na$_2$SO$_4$ | 5.5 |
| Al | 54.6 |
| Si | 5.0 |
| NaF | 7.0 |
| KBF$_4$ | 2.0 |
| SiO$_2$ | 0.5 |

The particle sizes of the constituents is the same as in Examples 3 and 4 (section I) with the exception of potassium fluoroborate flux, which has a particle size distribution as follows:

Potassium Fluoroborate (KBF$_4$)

| +50 mesh | Trace |
|---|---|
| −50 + 100 mesh | 73.3% |
| −100 + 200 mesh | 1.0% |
| −200 + 325 mesh | 9.6% |
| −325 mesh | 16.1% |

Each weldment consists of two pieces of 250 kcmil aluminum cable welded together in a graphite mold. The cable ends of one of the two welds were completely fused to the filler metal. The weld metal yield for both welds was 38%.

The other weld was subjected to the same type of hydrogen sulfide ($H_2S$) determination procedures as stated in Example 5. The weld and the slag were placed in a 2 quart can, which was then sealed with moistened absorbent paper inside. The hydrogen sulfide concentration was measured at 900 parts per million inside the can one hour after the can was sealed compared to over 2,000 parts per million for the weld and slag of Formula II from Example 5.

EXAMPLE 8

Two reactions were made using the Kovarik-type Formula II of Example 4. Each reaction utilized 100 grams of weld metal mixture. The slag from one of the welds was sprayed with an aerosol spray that contained orange terpene, while the slag from the other weld was untreated. The two slags were placed in separate 20 cu.in. containers with moist paper inside, then sealed. After one hour the untreated slag container had a hydrogen sulfide ($H_2S$) concentration of greater than 200 parts per million (ppm), while the treated slag container had a concentration of 12 ppm hydrogen sulfide.

EXAMPLE 9

Two reactions were made using the Kovarik-type Formula II of Example 4. Each reaction utilized 100 grams of weld metal mixture. One of the welds was sprayed with an aerosol spray that contained orange terpene, while the other weld was untreated. The two weldments were placed in separate 20 cu.in. containers with moist paper inside, then sealed. After one hour the untreated weld container had a hydrogen sulfide ($H_2S$) concentration of 650 parts per million (ppm), while the treated weld container had a concentration of 300 ppm hydrogen sulfide.

The present invention provides a process and exothermic reaction mixture for preparing weldments which exhibit a reduced hydrogen sulfide ($H_2S$) odor and an increase in filler metal yield. Further, the weldment exhibits improved resistance to corrosion while maintaining resistances similar to the pieces that are welded. Additionally, a method of further reducing the hydrogen sulfide ($H_2S$) odor of the weldment and slag is contemplated. This is accomplished by spraying the cooled weld and slag with a solution containing an orange terpene.

While the invention has been explained in relation to its preferred embodiments, it is understood that various modifications thereof will become apparent to those skilled in the art upon reading the specification. Therefore, it is to be understood that the invention disclosed herein is intended to cover such modifications as fall within the scope of the appended claims.

We claim:

1. An exothermic reaction mixture which upon initiation of an exothermic reaction forms a molten weld metal for use in joining a non-ferrous metal piece with at least one other metal piece, said exothermic reaction mixture comprising:
   a reducing agent;
   a filler metal; and
   two or more metallic compounds at least one of which is a Group I metal sulfate, which during said exothermic reaction are reduced by said reducing agent and form a compound with said reducing agent having a heat of formation which provides an exothermic reaction with sufficient heat to melt said filler metal.

2. An exothermic reaction mixture as set forth in claim 1 wherein said non-ferrous metal piece is an aluminum or aluminum alloy piece.

3. An exothermic reaction mixture as set forth in claim 1 wherein said reducing agent is selected from the group consisting of aluminum, magnesium, zirconium, and titanium.

4. An exothermic reaction mixture as set forth in claim 1 wherein said metallic compounds are oxygen containing metallic compounds.

5. An exothermic reaction mixture as set forth in claim 1 wherein at least one of said metallic compounds is a Group I metal sulfate selected from the group consisting of sodium sulfate, lithium sulfate, and potassium sulfate.

6. An exothermic reaction mixture as set forth in claim 1 wherein at least one of said metallic compounds is a group II metal compound.

7. An exothermic reaction mixture as set forth in claim 1 wherein at least one of said metallic compounds is a Group II metal sulfate.

8. An exothermic reaction mixture as set forth in claim 1 wherein said filler metal is aluminum.

9. An exothermic reaction mixture as set forth in claim 1 further comprising one or more Group I metal fluoride flux.

10. An exothermic reaction mixture as set forth in claim 1 further comprising at least one Group I metal fluoride selected from the group consisting of sodium fluoride, lithium fluoride, potassium fluoride, and sodium aluminum fluoride.

11. An exothermic reaction mixture as set forth in claim 1 further comprising at least one Group I metal fluoroborate flux.

12. An exothermic reaction mixture which upon initiation of an exothermic reaction forms a molten weld metal for use in joining one piece of aluminum or aluminum alloy with at least one other metal piece, said mixture of reactants comprising:
   about 20% to about 75% by weight aluminum;
   about 5% to about 50% by weight of a Group I metal sulfate;
   about 22% to about 50% by weight of a Group II metal sulfate;
   about 4% to about 20% by weight of at least one Group I metal fluoride;
   and
   about 0.1 to about 45% by weight silicon.

13. An exothermic reaction mixture which upon initiation of an exothermic reaction forms a molten weld metal for use in joining a non-ferrous metal piece with at least one other metal piece, said exothermic reaction mixture comprising:
   a reducing agent;
   a filler metal;
   one or more metallic compounds at least one of which is a Group I metal sulfate selected from the group consisting of sodium sulfate, lithium sulfate and potassium sulfate, which during said exothermic reaction are reduced by said reducing agent and form a compound with said reducing agent having a heat of formation which provides an exothermic reaction with sufficient heat to melt said filler metal; and at least one Group I metal fluoride flux selected from the group consisting of sodium fluoride, lithium fluoride, potassium fluoride, and sodium aluminum fluoride.

14. An exothermic reaction mixture as set forth in claim 13 wherein at least one of said fluxes is a Group I metal compound.

15. An exothermic reaction mixture as set forth in claim 13 further comprising at least one Group I metal fluoroborate.

* * * * *